(12) United States Patent
Cahill

(10) Patent No.: US 8,489,302 B2
(45) Date of Patent: Jul. 16, 2013

(54) SYSTEMS AND METHODS FOR DYNAMICALLY STABLE BRAKING

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 416 days.

(21) Appl. No.: 12/882,092

(22) Filed: Sep. 14, 2010

(65) Prior Publication Data

US 2012/0065816 A1    Mar. 15, 2012

(51) Int. Cl.
*B60T 8/00* (2006.01)

(52) U.S. Cl.
USPC ............... 701/76; 701/70; 701/78; 701/34.4

(58) Field of Classification Search
USPC ............ 701/3, 70, 76, 77, 78, 92, 34.4; 303/122–122.15, 159; 188/106 P
See application file for complete search history.

(56) References Cited

U.S. PATENT DOCUMENTS

| | | | | |
|---|---|---|---|---|
| 5,952,799 A | * | 9/1999 | Maisch et al. | 318/362 |
| 2005/0110337 A1 | * | 5/2005 | Zheng et al. | 303/10 |
| 2008/0296106 A1 | * | 12/2008 | Nilsson | 188/156 |
| 2009/0276133 A1 | | 11/2009 | May et al. | |
| 2011/0100769 A1 | | 5/2011 | Frank | |
| 2011/0155521 A1 | | 6/2011 | Thibault et al. | |

FOREIGN PATENT DOCUMENTS

WO     2008144378       11/2008
WO     WO 2008144378 A1 *  11/2008

OTHER PUBLICATIONS

GB; Search Report dated Nov. 18, 2011 in Application No. GB1112396.5.

* cited by examiner

*Primary Examiner* — Khoi Tran
*Assistant Examiner* — Spencer Patton
(74) *Attorney, Agent, or Firm* — Snell & Wilmer L.L.P.

(57) ABSTRACT

Systems and methods for dynamically stable braking are disclosed. A first electromechanical brake actuator controller may be placed in communication with a second electromechanical brake actuator controller, wherein each of the first electromechanical brake actuator controller and second electromechanical brake actuator controller are in communication with electromechanical brake actuators that are associated with the same wheel. The first electromechanical brake actuator controller and second electromechanical brake actuator controllers may then communicate electromechanical brake actuator status information and take corrective measures in accordance with the status information.

5 Claims, 4 Drawing Sheets

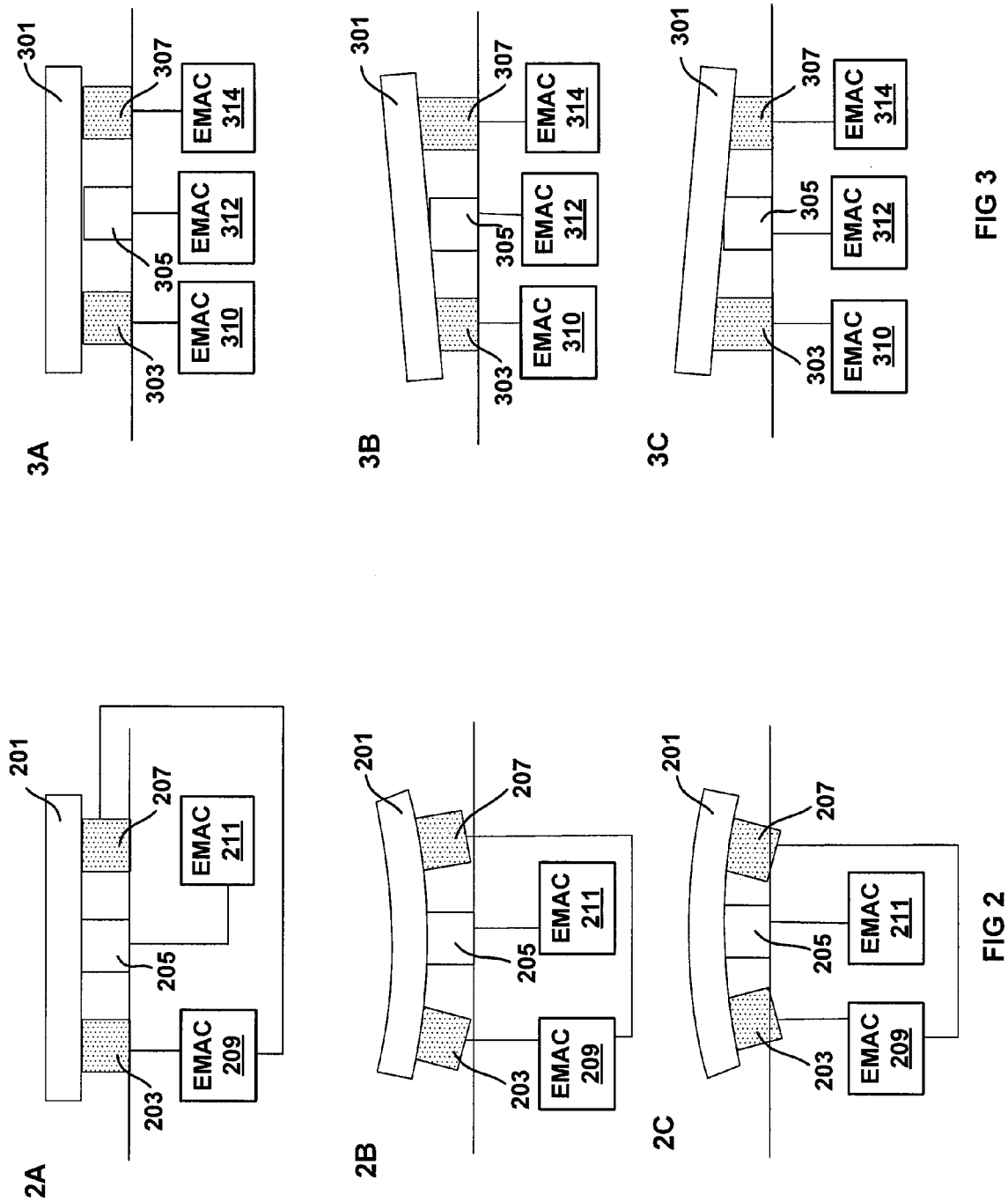

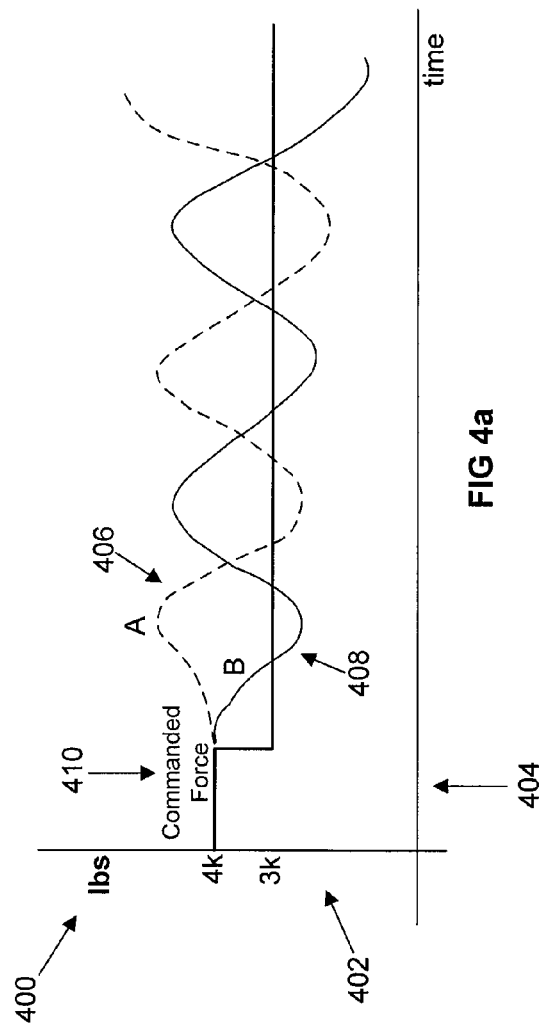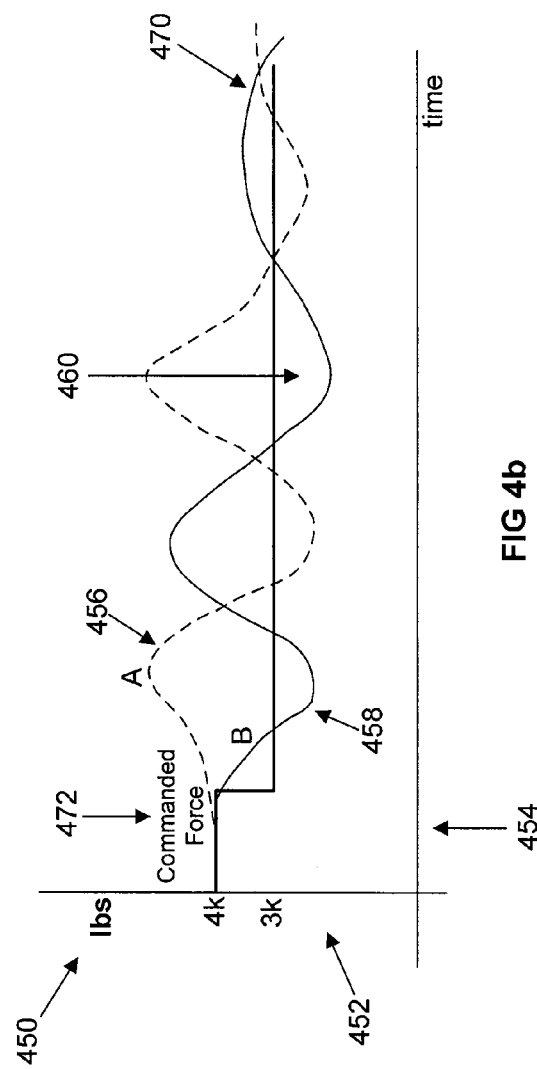

SYSTEMS AND METHODS FOR DYNAMICALLY STABLE BRAKING

FIELD OF INVENTION

The present disclosure generally relates to braking, and more particularly, to systems and methods for dynamically stable braking.

BACKGROUND

In modern aircraft, braking is achieved when electromechanical actuators exert force (pressure) on a brake stack. Typically, the electromechanical actuators are spaced about a circumference of a brake stack. The electromechanical actuators may be controlled via one or more electromechanical actuator controllers. In certain circumstances, the electromechanical actuators may exert uneven force upon the brake stack, with each electromechanical actuator varying its force output over time. For example, an electromechanical actuator may apply an amount of force different from that commanded by an electromechanical actuator controller. In such cases, uneven force distribution may deform or deflect a portion of the brake stack, interfering with braking stability and degrading braking performance. The electromechanical actuator controllers may sense this force imbalance and attempt to correct it by commanding increased or decreased force from the same or other electromechanical brake actuators in an attempt to end the period of instability. However, other electromechanical actuator controllers may also recognize the imbalance and seek to correct the imbalance by taking corrective measures. This could result in a continuous cycle of over/under-correction by one electromechanical actuator controller responsive to the over/under-correction by another electromechanical actuator controller. Thus, braking becomes unstable over a period of time, and accordingly, there is a need for alternate methods and systems for dynamically stable braking, especially in aircraft braking.

SUMMARY

In various embodiments, a system is provided comprising a first electromechanical brake actuator controller and a second electromechanical brake actuator controller, a first communication channel in communication with the first electromechanical brake actuator controller and the second electromechanical brake actuator controller, a first electromechanical brake actuator in electrical communication with the first electromechanical brake actuator controller, a second electromechanical brake actuator in electrical communication with the second electromechanical brake actuator controller. The first electromechanical brake actuator controller transmits status information pertaining to the first electromechanical brake actuator to the second electromechanical brake actuator controller via the first communication channel. The second electromechanical brake actuator controller commands the second electromechanical brake actuator responsive to the status information pertaining to the first electromechanical brake actuator.

In various embodiments, a method is provided comprising, receiving, at a second electromechanical brake actuator controller, status information pertaining to a first electromechanical brake actuator, wherein the status information is transmitted to the second electromechanical brake actuator controller by a first electromechanical brake actuator controller and commanding, from the second electromechanical brake actuator controller, a second electromechanical actuator in accordance with the status information.

In various embodiments, a system is provided comprising a first electromechanical brake actuator controller and a second electromechanical brake actuator controller, a first communication channel in communication with the first electromechanical brake actuator controller and the second electromechanical brake actuator controller, a first electromechanical brake actuator in electrical communication with the first electromechanical brake actuator controller, a second electromechanical brake actuator in electrical communication with the second electromechanical brake actuator controller. The first electromechanical brake actuator controller transmits a failure notification pertaining to the first electromechanical brake actuator to the electromechanical brake actuator controller via the first communication channel. The second electromechanical brake actuator controller receives a desired deceleration command, and the second electromechanical brake actuator controller commands the second electromechanical brake actuator responsive to the failure notification, so that the second electromechanical brake actuator applies a force sufficient to achieve the desired deceleration of the desired deceleration command.

BRIEF DESCRIPTION OF THE DRAWINGS

FIGS. 2a-2c illustrate a braking instability scenario, in accordance with various embodiments;

FIGS. 3a-3c illustrate an additional braking instability scenario, in accordance with various embodiments;

FIGS. 4a-4b illustrate braking instability and an instability correction, in accordance with various embodiments.

DETAILED DESCRIPTION

Figure 1:
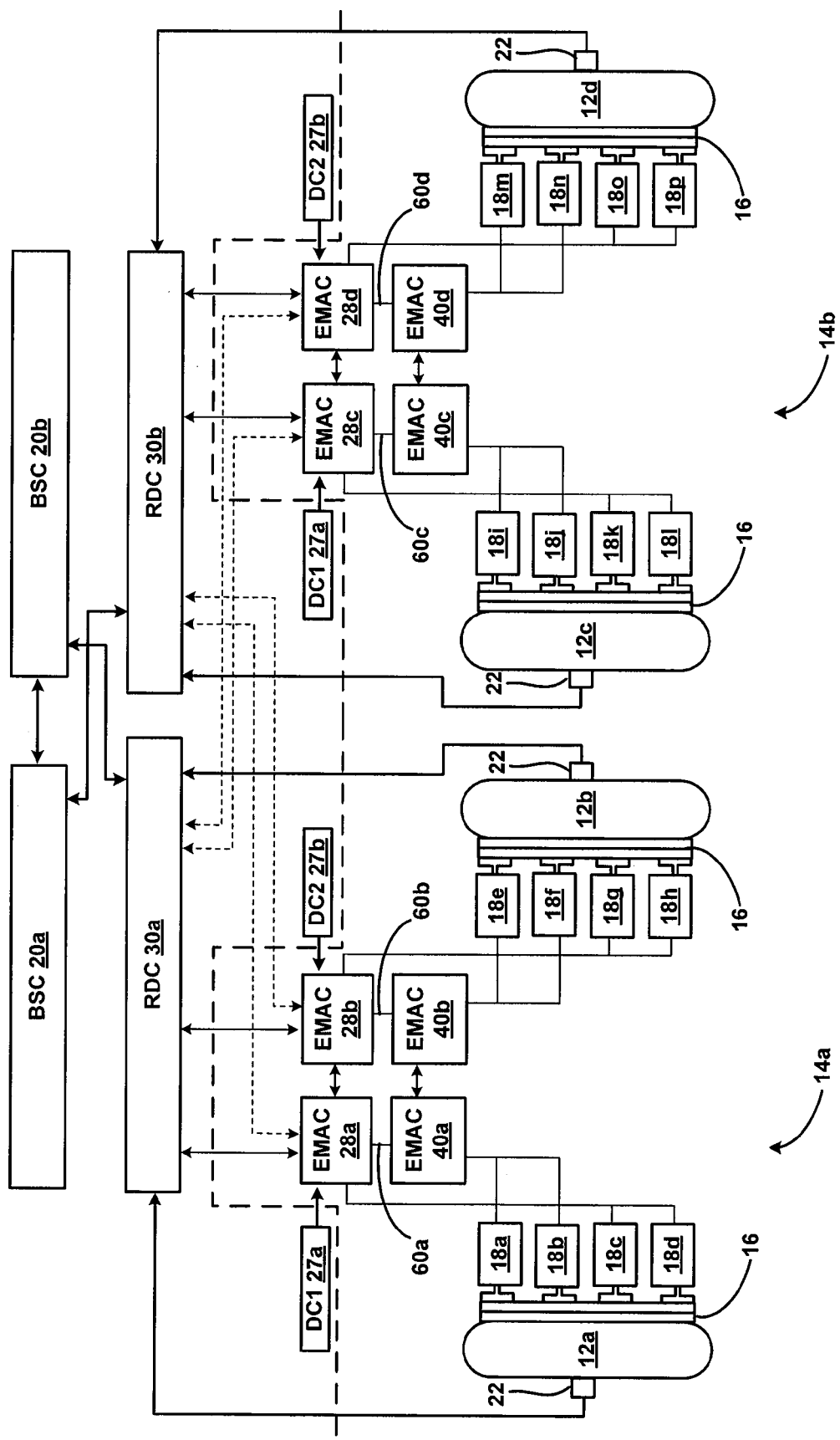
FIG. 1 illustrates a braking system, in accordance with various embodiments.

The detailed description of exemplary embodiments herein makes reference to the accompanying drawings, which show exemplary embodiments by way of illustration and its best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Any reference to applying a force (or similar phrases) may include at least partially applying a force. Any reference to "electrical communication" is referring to one embodiment, and those skilled in the art will appreciate that other types of communication are contemplated. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

As described above, electromechanical brake actuators (EBA) are typically spaced about a circumference of a brake stack. The EBAs may be controlled via one or more electromechanical actuator controllers (EMACs). In various embodiments, a communication channel may be disposed between two or more EMACs, so that EBA status information may be communicated between EMACs. An EMAC may then take action responsive to the status information, increasing braking stability. For example, a first EMAC may command additional force output from an associated EBA in the event the first EMAC receives status information from a second EMAC via the communication channel indicating the failure of an EBA associated with the second EMAC. In this manner, both the first EMAC and the second EMAC harmonize their response to the unexpected EBA status, thereby increasing braking stability by preventing (or minimizing) a cycle of over and under correction. Also for example, a first EMAC may command an associated EBA to adjust its frequency response rate in the event the first EMAC receives status information from a second EMAC via the communication channel indicating the force output of an EBA associated with the second EMAC. In this manner, both the first EMAC and the second EMAC harmonize their response to the status of their respective EBAs, thereby increasing braking stability by preventing (or minimizing) a cycle of over and under correction.

For example, with reference to FIG. 1, an embodiment of a braking system 100 for an aircraft is illustrated. The braking system 100 is shown as providing braking with respect to four wheels 12, of which two wheels 12a and 12b are mounted to a left landing gear truck 14a of an aircraft, and two wheels 12c and 12d are mounted to a right landing gear truck 14b of the aircraft. Each wheel 12 has a brake stack assembly 16. Braking force may be applied to the brake stack assembly 16 using electromechanical brake actuators 18. In an embodiment as illustrated in FIG. 1, each wheel 12 is associated with four EBAs 18. Further, a first wheel 12a is associated with EBAs 18a-18d, a second wheel 12b is associated with EBAs 18e-18h, a third wheel 12c is associated with EBAs 18i-18l, and a fourth wheel 12d is associated with EBAs 18m-18p.

It will be appreciated that various embodiments of the disclosed braking system 10 may be extended to aircraft that include any number of wheels 12, any number of landing gear trucks 14, any number of axels per truck, and/or any number of EBAs 18.

Various embodiments of the braking system 10 include an upper level controller, or brake system controller (BSC) 20, for providing overall control of the braking system 10. In an embodiment as illustrated in FIG. 1, two BSCs 20a, 20b are present so as to provide redundancy to the braking system 10.

In accordance with various embodiments, the BSCs 20 may receive an input brake command indicative of a desired amount of braking. For example, brake pedals within the cockpit of the aircraft may be depressed to indicate a desired amount of braking, or an autobrake switch may generate the input brake command. The input brake command is then derived from the distance the brake pedals are depressed and/or from the autobrake selection.

In response to the input brake command, the BSCs 20 derive an output command signal in the form of a brake control signal or multiple brake control signals. Collectively, the brake control signals are intended to effectuate the desired amount of braking in relation to the input brake command. Where deceleration and/or antiskid control occurs, data from sensors 22 associated with each wheel 12 and/or each EBA 18 may be used to effectuate the desired amount of braking in conjunction with the input brake command.

In an embodiment, the sensors 22 may include, for example, a brake temperature monitoring system (BTMS), a tire pressure monitoring system (TPMS), a wheel speed sensor (WSS), an applied torque sensor (ATS), a wear pin monitoring system (WPMS), a wheel and gear vibration monitoring system (WGVMS), a force/pressure sensor (e.g., a load cell), etc. The force/pressure sensor may form part of the EBA 18.

The output of the BSCs 20, in various embodiments, may be in the form of output command signals that indicate a brake clamp force that is called for by the input brake command. These signals may be input to one or more electromechanical actuator controllers 28 and EMACs 40 that convert the command signals from the BSC into individual drive signals for the individual EBAs 18. Drivers within the EMACs 28 and 40 convert the brake control signals into drive signals that are respectively applied to the EBAs 18. The BSCs 20 may further communicate directly with the EBAs 18 without the EMACs 28 and 40, and each EBA 18 may convert the brake control signals into a drive signal for the corresponding EBA 18.

In an embodiment, the drive signal for an individual EBA 18 drives a motor within the EBA 18 to position an actuator of the EBA. The motor may be driven to advance the actuator for the application of force to the brake stack 16 or to retract the actuator to reduce and/or cease the application of force to the brake stack 16. In various embodiments, non-electromechanical brake actuators (e.g., hydraulic actuators) may be used. In such embodiments, an EMAC may be configured to control the brake actuator either directly or through an additional device.

The EMACs 28 and 40, in various embodiments, receive power from a power bus. For example, two of the EMACs 28, such as a first EMAC 28a and a third EMAC 20c, may receive power from a first power bus 27a (for example, as referred to in FIG. 1 as DC1) of the aircraft to operate electronics in the respective EMACs 28 and to supply actuation signals to the EBAs 18. Similarly, the other two of the EMACs 28, such as a second EMAC 28b and a fourth EMAC 28d, may receive power from a second power bus 27b (for example, as referred to in FIG. 1 as DC2) of the aircraft to operate electronics in the respective EMACs 28 and to supply actuation signals to the EBAs 18.

In an embodiment, the brake control signals from the BSCs 20 are directed to EMACs 28 and 40 through a network of the aircraft. Signals may be exchanged between the BSCs 20 and the EMACs 28 and 40 through remote data concentrators (RDCs) 30. With continued reference to FIG. 1, two RDCs 30a and 30b are present so as to provide redundancy to the communications pathways. Primary communication links between the EMACs 28 and 40 and the RDCs 30 are shown in solid lines in FIG. 1 and secondary (e.g., backup) communication links between the EMACs 28 and 40 and RDCs 30 are shown in dotted lines in FIG. 1.

Sensors 22 in various embodiments are used to sense various conditions associated with the braking system. The sensors 22 may communicate sensor data with the BSCs 20 via the RDCs 30. It should be understood that the illustrated data pathways are merely representative and that other configurations may be used. For instance, each sensor 22 may have an independent communication link with more than one RDC 30. Sensors 22 may be wheel speed sensors (which may detect wheel velocity and deceleration) and/or torque detecting sensors. Further, the sensors 22 may communicate with the EMACs 28, other EBAs 18, and/or directly with BSCs 20. For example, sensors 22 may determine wheel deceleration and/or torque about the wheel, as described above. Sensors 22 may communicate wheel deceleration information and/or torque about the wheel information to EMACs 40 and 28.

Any of the BSCs, EMACs, and EBAs may contain a computing device (e.g., a processor) and an associated memory. The associated memory may contain executable code for performing braking control. The associated memory may comprise an article of manufacture including a computer-readable medium having instructions stored thereon that, if executed by a computing device (e.g., a processor), cause the computing device to perform various methods.

EMACs 28 and 40 and EBA 18 each may have a frequency response (also referred to as a frequency response rate). A frequency response may mean that a commanded change may only occur at a certain rate. In various embodiments, EMACs 28 and 40 and EBA 18 may operate at 12 Hz, though other frequency response rates such as that from 1 Hz to 60 Hz and more preferably from 6 Hz to 24 Hz may be used in various embodiments. The frequency response of EMACs 28 and 40 and EBA 18 is variable and may be altered over time. For example, the EMACs 28 and 40 may command EBA 18 to change its frequency response rate from one value to another.

Figure 5:
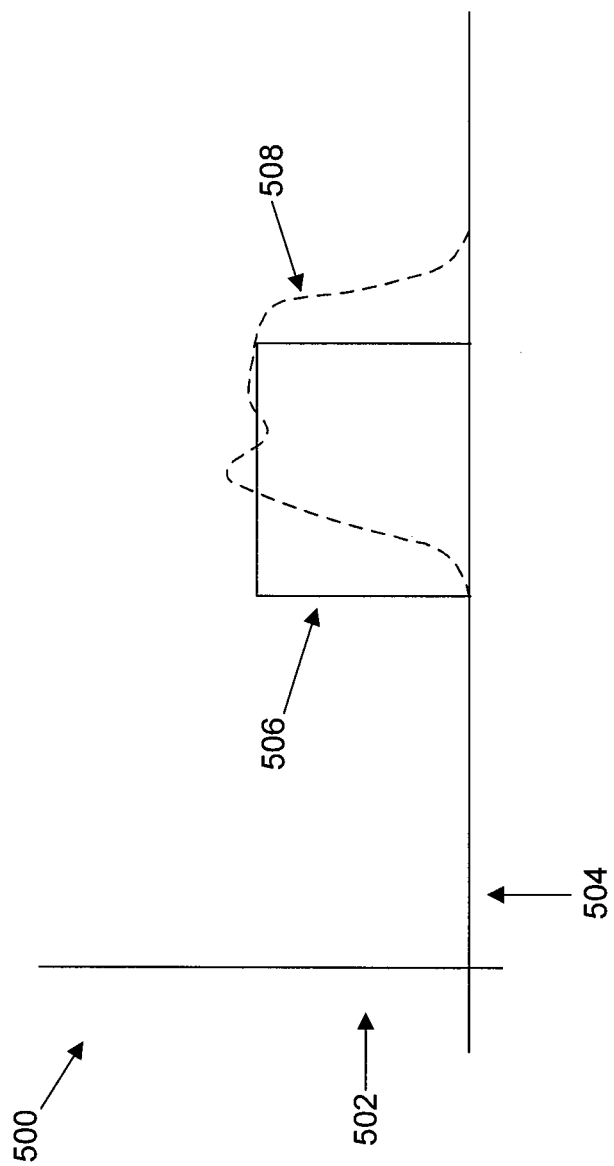
FIG. 5 illustrates a braking response, in accordance with various embodiments.

With brief reference to FIG. 5, graph 500 shows the relationship of commanded force to the actual force output of an EBA. The x axis 502 represents output force and the y axis 504 represents time. A commanded force is illustrated over a period of time as commanded force 506. The actual force output of the EBA is represented by force line 508. As shown, the EBA may experience a lag in the application of the commanded force, the EBA may exceed the commanded for a period of time, and the EBA may continue to apply force after the command is rescinded (e.g., a command of 0 force is given). Each EBA may have a different response profile due to a variety of factors. The variance in the actual EBA response thus has the potential to threaten braking stability.

With reference back to FIG. 1, EMACs 28 and 40 are in communication with EBAs 18. In particular, EMAC 40a is in communication with EBA 18a and 18b, EMAC 40b is in communication with EBA 18e and 18f, EMAC 40c is in communication with EBA 18i and 18j, and EMAC 40d is in communication with EBA 18m and 18n. Likewise, EMAC 28a is in communication with EBA 18c and 18d, EMAC 28b is in communication with EBA 18g and 18h, EMAC 28c is in communication with EBA 18k and 18l, and EMAC 28d is in communication with EBA 18o and 18p.

EMAC communication channel 60 provides the ability for EMACs 28 and 40 to communicate. EMAC communication channel 60 may comprise any suitable device or apparatus that may facilitate communications, such as a communications bus or network. EMAC communication channel 60a places EMAC 40a is in communication with EMAC 28a, EMAC communication channel 60b places EMAC 40b is in communication with EMAC 28b, EMAC communication channel 60c places EMAC 40c is in communication with EMAC 28c, EMAC communication channel 60d places EMAC 40d is in communication with EMAC 28d. EMACs 28a and 40a may communicate EBA status information using communication channel 60a. EMACs 28b and 40b may communicate EBA status information using communication channel 60b. EMACs 28c and 40c may communicate EBA status information using communication channel 60c. EMACs 28c and 40c may communicate EBA status information using communication channel 60c.

With reference to FIGS. 2a-2c, an exemplary scenario of braking instability is illustrated. With reference to FIG. 2a, plate 201 is in physical communication with an aircraft brake stack. Force exerted on plate 201 is transferred to the aircraft brake stack to provide aircraft braking. In the illustrated embodiment, plate 201 is in the form of a disk. EBAs 203, 205, and 207 are in physical communication with plate 201. EBAs 203, 205, and 207 may apply a force to plate 201 in accordance with command received from other components, such as an EMAC. For example, EMAC 209 is in electrical communication with EBAs 207 and 203 and EMAC 211 is in electrical communication with EBA 205. FIG. 2a depicts an aircraft brake while EBAs 203, 205, and 207 are not applying any force to plate 201.

With reference to FIG. 2b, plate 201 is illustrated in a state of braking instability. EBAs 203 and 207 are exerting a force greater than the force exerted by EBA 205. This situation could be the result of several factors. For example, EBAs 203 and 207 may be producing more force than commanded by EMAC 209. Also for example, EBA 205 may be in a failure state and thus exerting less force than commanded by EMAC 211. The resultant imbalance of force against plate 201 creates an imbalance in the brake stack and leads to a degradation of braking stability.

Moreover, in the scenario of FIG. 2b, EMAC 211 may receive feedback from EBA 205, informing EMAC 211 of the application of a less than expected force. EMAC 211 may then command additional force from EBA 205. Concurrently, EMAC 209 may receive feedback other aircraft components, informing EMAC 209 that the aircraft is decelerating at a rate different from that expected given the force being applied to plate 201, among other factors. In such a scenario, EMAC 209 may command that additional force be applied by EBAs 203 and 207, enhancing braking instability.

With reference to FIG. 2c, plate 201 is illustrated in an additional state of braking instability. EBA 205 is exerting a force greater than the force exerted by EBAs 203 and 207. This situation could be the result of several factors. For example, EBA 205 may be producing more force than commanded. by EMAC 211. Also for example, EBA 203 and 207 may be in a failure state and thus exerting less force than commanded by EMAC 209. The resultant imbalance of force against plate 201 creates an imbalance in the brake stack and leads to a degradation of braking stability.

Moreover, in the scenario of FIG. 2c, EMAC 209 may receive feedback from EBAs 203 and 207, informing EMAC 209 of the application of a less than expected force. EMAC 211 may then command additional force from EBA 205. Concurrently, EMAC 209 may receive feedback other aircraft components, informing EMAC 209 that the aircraft is decelerating at a rate different from that expected given the force being applied to plate 201, among other factors. In such a scenario, EMAC 209 may command that additional force be applied by EBAs 203 and 207, enhancing braking instability.

With reference to FIGS. 3a-3c, additional exemplary braking instability forms are shown. With reference to FIG. 3a, plate 301 is in physical communication with an aircraft brake stack. Force exerted on plate 301 is at least partially transferred to the aircraft brake stack to provide aircraft braking. In the illustrated embodiment, plate 301 is in the form of a disk. EBAs 303, 305, and 307 are in physical communication with plate 301. EBAs 303, 305, and 307 may apply a force to plate 301 in accordance with command received from other components, such as an EMAC. For example, EMAC 310 is in electrical communication with EBA 303, EMAC 312 is in electrical communication with EBA 305, and EMAC 314 is in electrical communication with EBA 307. FIG. 3a depicts an aircraft brake, while EBAs 303, 305, and 307 are not applying any force to plate 301.

With reference to FIG. 3b, plate 301 is illustrated in a state of braking instability. EBA 307 is exerting a greater force than EBA 305, which itself is exerting a greater force than EBA 303. This situation could be the result of several factors. For example, EBAs 303 and 305 may be producing less force than commanded by EMACs 310 and 312. Also for example, EBA 307 may be in a failure state and thus exerting more force than commanded by EMAC 314. The resultant imbalance of force against plate 301 creates an imbalance in the brake stack and leads to a degradation of braking stability.

Moreover, in the scenario of FIG. 3b, EMAC 310 may receive feedback from EBA 303, informing EMAC 310 of the application of a less than expected force. EMAC 310 may then command additional force from EBA 303. Concurrently, EMAC 314 may receive feedback other aircraft components, informing EMAC 314 that the aircraft is decelerating at a rate different from that expected given the force being applied to plate 301, among other factors. In such a scenario, EMAC 314 may command that additional force be applied by EBA 307, thereby further overloading EBA 307 and thus enhancing braking instability.

With reference to FIG. 3c, plate 301 is illustrated in an additional state of braking instability. EBA 303 is exerting a force greater than the force exerted by EBAs 305 and 307. This situation could result from a response of EMACs 310, 312, and 314 to the situation illustrated in FIG. 3b. In other words, EMAC 307 may have recognized that EBA 307 was applying too much force and thus commanded EBA 307 to apply less force. However, as shown in FIG. 3c, EBA 307 exerts a less than commanded force, resulting in underloading of plate 301. Concurrently, EMAC 310 may have recognized that EBA 303 was applying too little force and thus commanded EBA 303 to apply more force to plate 301. However, EBA 303 may exert a greater than commanded force, thus leading to overcorrection.

The instability forms illustrated in FIGS. 2 and 3, among others, may be mitigated or eliminated in accordance with various embodiments. Through the use of a communication channel between EMACs, for example, control of EBAs may be harmonized.

For example, with reference to FIG. 1, in the event EBA 18a failed to function during braking, a failure notification may be transmitted from EMAC 40a to EMAC 28a via EMAC communication channel 60a. In this manner, EMAC 28a may command additional force to be applied by EBAs 18c and 18d and EMAC 40a may command additional force on EBA 18b.

Also for example, with continued reference to FIG. 1, in the event EBA 18a failed to exert force equal to the amount of force commanded by EMAC 40a, EMAC 40a could transmit this status information to EMAC 28a via EMAC communication channel 60a. In this manner, EMAC 28a may command additional force to be applied by EBAs 18c and 18d and EMAC 40a may command additional force on EBA 18b to compensate for the reduced force output of EBA 18a. Likewise, if EBA 18a exerted a greater than commanded force, EMAC 40a could transmit this status information to EMAC 28a via EMAC communication channel 60a and both EMACs could adjust the force output of the EBAs 18b-18d in accordance with such status information.

In various embodiments, an EMAC may receive information relating to an EBA from the EBA itself, from another EMAC, from a BSC, or from other aircraft components. For example, a BSC may receive aircraft deceleration information from other aircraft components. A BSC may also receive other aircraft status information, such as wing flap status and current wind conditions, from other aircraft components. A BSC may then compare the aircraft deceleration information (i.e., observed aircraft deceleration information) with the force exerted by each EBA of the aircraft. A BSC, or, in various embodiments, an EMAC, may determine if the observed aircraft deceleration information is consistent with the amount of force applied by the various EBAs. Stated another way, a BSC or EMAC may recognize an EBA malfunction (whether it be complete failure or the failure to output the commanded force) using observed aircraft deceleration information. EMACs may communicate this information to other EMACs via communication channel to better distribute and apply braking force. In addition, EMACs may communicate with other EMACs to better perform anti-skid maneuvers.

For example, with reference to FIG. 1, BSC 20a may receive an observed aircraft deceleration of 5 m/s$^2$ from another aircraft component. As used herein, deceleration values are given as positive values to represent deceleration and negative values to represent acceleration. For example, aircraft acceleration (represented by a negative aircraft deceleration value) occurs when an aircraft is accelerating in a forward direction, such as during takeoff. Aircraft deceleration occurs when an aircraft is accelerating in a backward direction, such as during landing. BSC 20a may then compare the observed aircraft deceleration with the force commanded of each EBA. This comparison may indicate that the BSC expected the aircraft deceleration to be 4 m/s$^2$ given the applied force of the EBAs, the wing flap status, and the current wind conditions. BSC 20a may then determine that additional force must be applied by the EBAs to increase aircraft deceleration.

In such a scenario, BSC 20a instructs EMACs 40a and 28a to command the EBAs to exert additional force. However, after EMACs 40a and 28a command additional force from EBAs 18a-18d, EMAC 40a may then receive status information from EBA 18a that shows EBA 18a has failed to increase its force output. EMAC 40a may then use EMAC communication channel 60a to provide this status information to EMAC 28a, which may then take corrective measures by exerting additional output force on EBAs 18c-d.

Furthermore, in response to status information received from a communication channel, an EMAC may command one or more of EBAs to change a frequency response rate. A change in frequency response rate of an EBA may be performed so that the EBA may be allowed to synchronize with another EBA associated with the same wheel. In this manner, two or more unsynchronized EBAs may synchronize after the passage of time.

For example, with reference to FIG. 4a, braking instability 400 is shown on a graph. The x axis 402 indicates increasing commanded force and the y axis 404 indicates time. Line 406 represents the force output of a first EBA and line 408 represents the force output of a second EBA. At time 0, both first and second EBAs are outputting a force of 4000 lbs as shown by commanded force line 410. After time 0, the commanded force is decreased to 3000 lbs, as shown in commanded force line 410. As described above, the first EBA and the second EBA may respond at varying rates. Due to this response difference, the force output of the first EBA may compensate for the second EBA, until each EBA begins to correct itself. As shown by lines 406 and 408, the pattern of over and under correction of the first EBA and second EBA are out-of-phase, never reaching equilibrium.

However, in various embodiments, a first EBA and a second EBA may be paired with EMACs that communicate via a communication channel and thus status information of each EBA may be transmitted via the communication channel. Each EBA may then take an action responsive to the status information. For example, with reference to FIG. 4b, abbreviated braking instability 450 is shown on a graph. The x axis 452 indicates increasing commanded force and the y axis 454 indicates time. Line 456 represents the force output of a first EBA and line 458 represents the force output of a second EBA. At time 0, both first and second EBAs are outputting a force of 4000 lbs as shown by commanded force line 472. After time 0, the commanded force is decreased to 3000 lbs, as shown in commanded force line 472. As described above, the first EBA and the second EBA may respond at varying rates. Due to this response difference, the force output of the first EBA may compensate for the second EBA, until each EBA begins to correct itself. As shown by lines 456 and 458, the pattern of over and under correction of the first EBA and second EBA become out-of-phase. However, the EMACs corresponding to the first EBA and second EBA may communicate status information with one another via a communication channel. Thus, an out-of-phase state may be recognized and ameliorated. For example, the out-of-phase cycle may be recognized by one or more EMACs at or before point 460. At point 460, the EMAC controlling the second EBA may command the second EBA to reduce its frequency response rate. For example, the second EBA's response rate may be reduced from 12 Hz to 8 Hz. In this manner, the slowing of the second EBA's response rate allows the second EBA to move in-phase with the first EBA. Thus, at point 470, the force output of the first EBA and the second EBA begin to harmonize and eventually both the first EBA and the second EBA reach an equilibrium where each is exerting the commanded force. When equilibrium between the first EBA and the second EBA nears, the second EBA's response rate may be returned to 12 Hz so that equilibrium may be maintained.

In addition to functions during braking, a communication channel that links two EMACs that control EBAs on the same wheel may be useful in diagnostic circumstances. In a diagnostic environment, EBA failures or other anomalies may be simulated and the EMACs tested to demonstrate that appropriate corrective measures are taken. In addition, EMACs may command various force outputs for each EBA and the actual EBA output may be determined and compared back to the commanded output.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Moreover, where a phrase similar to "at least one of A, B, or C" or "at least one of A, B, and C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
    a first electromechanical brake actuator controller and a second electromechanical brake actuator controller;
    a first communication channel in communication with the first electromechanical brake actuator controller and the second electromechanical brake actuator controller;
    a first electromechanical brake actuator in electrical communication with the first electromechanical brake actuator controller;
    a second electromechanical brake actuator in electrical communication with the second electromechanical brake actuator controller;
    wherein the first electromechanical brake actuator controller transmits a failure notification pertaining to the first electromechanical brake actuator to the second electromechanical brake actuator controller via the first communication channel;
    wherein the second electromechanical brake actuator controller receives a desired deceleration command; and
    wherein the second electromechanical brake actuator controller commands the second electromechanical brake actuator responsive to the failure notification so that the second electromechanical brake actuator applies a force sufficient to achieve the desired deceleration of the desired deceleration command.

2. The system of claim 1, wherein the failure notification indicates complete failure.

3. The system of claim 1, further comprising a first brake system controller in electrical communication with the first electromechanical brake actuator controller.

4. The system of claim 3, wherein the first brake system controller communicates aircraft deceleration information to the first electromechanical brake actuator controller.

5. The system of claim 1, wherein the first electromechanical brake actuator controller communicates aircraft deceleration information to the second electromechanical brake actuator controller.

* * * * *